B. W. KADEL.
CAR TRUCK.
APPLICATION FILED JAN. 28, 1921.
1,414,956.
Patented May 2, 1922.
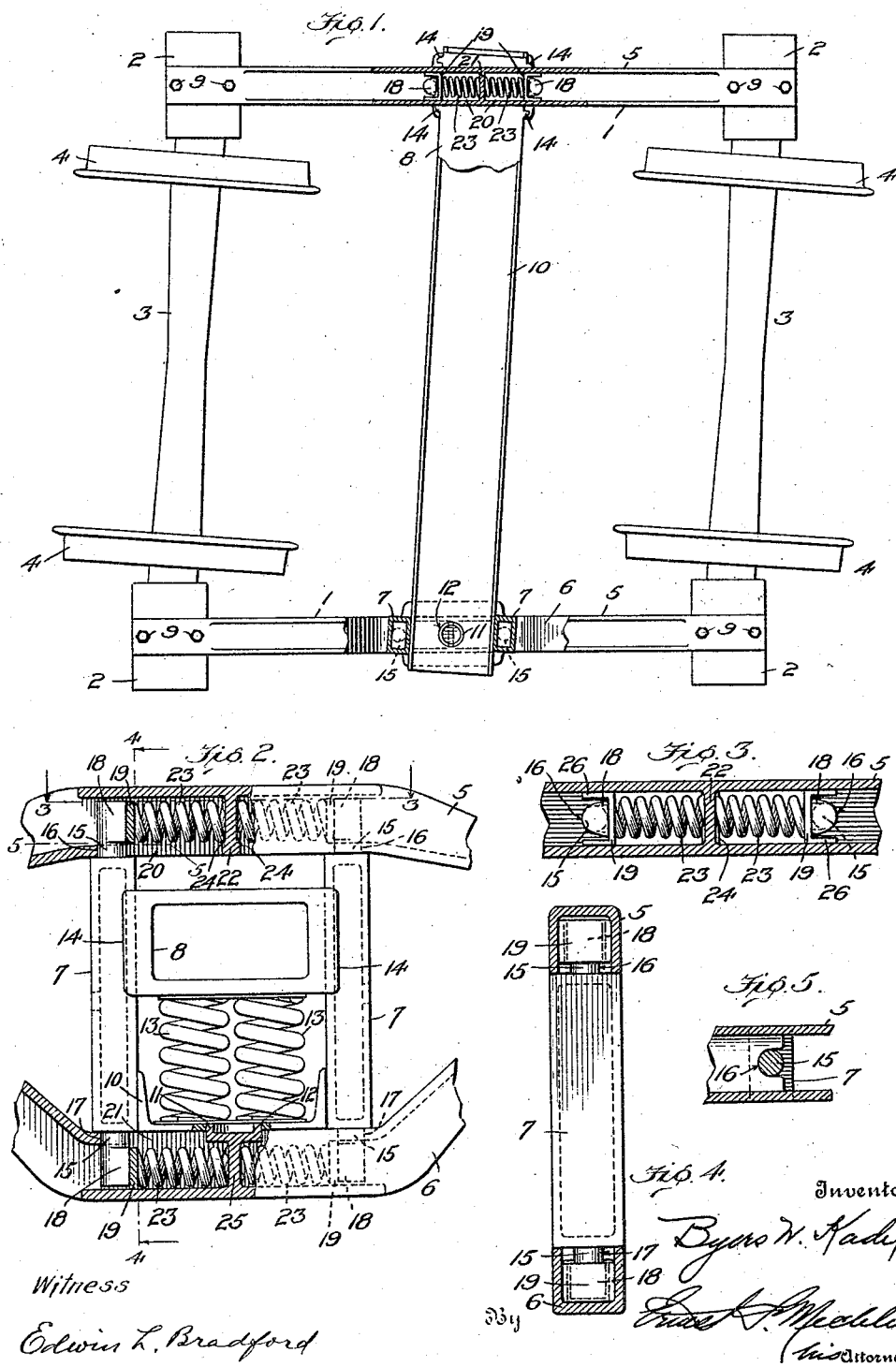

UNITED STATES PATENT OFFICE.

BYERS W. KADEL, OF BALTIMORE, MARYLAND, ASSIGNOR TO THE T. H. SYMINGTON COMPANY, OF NEW YORK, N. Y., A CORPORATION OF DELAWARE.

CAR TRUCK.

1,414,956.  Specification of Letters Patent.  Patented May 2, 1922.

Application filed January 28, 1921. Serial No. 440,592.

*To all whom it may concern:*

Be it known that I, BYERS W. KADEL, a citizen of the United States, residing at Baltimore, in the State of Maryland, have invented certain new and useful Improvements in Car Trucks; and I do hereby declare the following to be a full, clear, and exact description of the invention, such as will enable others skilled in the art to which it appertains to make and use the same.

My invention relates to flexible car trucks and particularly to an improved form of flexible truck having means for yieldingly resisting displacement of the side frame members longitudinally of the truck from normal position and for restoring said side frames to their normal or square relation upon the cessation of the force which has induced such displacement. As is well known, the passage of a truck around a curve causes a relative longitudinal movement of the truck frames which results in throwing the truck out of square and consequently increases the flange pressure of the truck wheels upon the rails, thus producing more rapid wear of the wheels and of the heads of the rails. Similar effects result from the truck passing over bad rail joints and defective switch points. By my invention the flange wear of the wheels of a flexible truck is minimized and the wear of the rails is also reduced.

The principal object of the invention, generally stated, is to afford simple, compact and efficient means for yieldingly maintaining the parts of a flexible truck in square relation, the said means being of a nature especially suited for directly cooperating with both the bolster and the spring plank of the truck to oppose relative longitudinal displacement of the side frames from normal position and to enforce restoration of said side frames to square relation.

The principal feature of the invention by which this object is accomplished consists in providing the side frame members with yieldingly supported rotatable struts which serve as bolster guide columns and which are adapted to be actuated by the truck bolster as well as by the spring plank of the truck when the latter is embodied in the truck structure. There are further features of the invention, residing in particular elements and in combinations of elements as will hereinafter appear.

In the drawings which embody the preferred form in which I contemplate applying the principle of the invention, the scope whereof is pointed out in the claims:—

Figure 1 is a view, partly in plan and partly in horizontal section, of a car truck embodying the invention, portions of the truck bolster and of one of the side frame members being broken away and the parts being shown in the out of square relation such as they assume when the truck passes around a curve.

Figure 2 is a detail view, partly in elevation and partly in vertical section, showing the central portion of one of the side frame members and the parts associated therewith.

Figure 3 is a detail sectional view on the line 3—3, Fig. 2.

Figure 4 is a sectional view on the line 4—4, Fig. 2.

Figure 5 is a detail horizontal section on the line 5—5, Fig. 2.

In the drawings, 1, 1 indicate side frame members which are capable of relative movement longitudinally of the truck. Each of the side frames 1 is furnished at its opposite ends with journal boxes 2 receiving the journal ends of axles 3 upon which the truck wheels 4 are mounted.

The truck side frame members 1 may be and preferably are each constructed of connected elements comprising a compression member 5, a tension member 6, and a plurality of spaced struts 7 which are interposed between the compression member 5 and the tension member 6 and which constitute rotatable guide columns for the truck bolster 8. The tension and compression members may be secured together and to the journal boxes 2 by journal box bolts 9.

When a spring plank 10 is employed, as is preferred, its opposite ends may be pivotally connected to the side frame members 1 by means of upwardly extending pivot bosses 11 formed on the respective tension members 6 and entering correspondingly shaped apertures 12 in the spring plank. The spring plank and the bolster 8 extend between the struts or guide columns 7 of the side frames and are adapted to engage the opposed faces of said columns, the spring plank preferably being of channel form and its flanges being adapted to cooperate with said columns. The bolster 8 may be yieldingly supported by suitable springs 13 in the usual manner.

The bolster, which may be of the form commonly employed in flexible trucks, is preferably provided with flanges or guide members 14 between corresponding pairs of which the respective struts or bolster guide columns 7 extend. The bolster guide members 14 on each side of the bolster 8 are spaced apart sufficiently to allow the bolster freely to angle horizontally without drawing the side frames toward each other.

The struts or guide columns 7 are provided at their opposite ends with cylindrical pintles or trunnions 15 which rotatably bear upon correspondingly curved seats 16 and 17 with which the compression member 5 and the tension member 6 of the side frame member 1 are respectively provided. Each of the guide columns 7 is formed at its opposite ends with heads or projections 18 which constitute cams or lever arms that are adapted to actuate the corresponding followers 19 when said guide columns rotate in either direction from their normal positions. These followers 19 are mounted to slide longitudinally of the truck in downwardly opening pockets 20 of the compression member 5 and in upwardly opening pockets 21 formed in the tension member 6. The pockets 20 are separated by a vertically extending wall 22 which forms an abutment for longitudinally extending springs 23 which are interposed between said abutment and the respective followers 19. The abutment wall 22 may conveniently have shoulders 24 serving to retain the springs in assembled position. The pockets 21 in the tension member 6 of the side frame are also preferably separated by a wall 25 forming an abutment for the adjacent springs 23 which are interposed between the corresponding followers 19 and said abutment. The springs 23 are preferably assembled in the pockets 20 and 21 under considerable initial compression, and the respective followers 19 may advantageously be provided with longitudinally extending side walls 26 which, by cooperating with the neighboring vertical walls of the compression member 5 and tension member 6, guide the followers and prevent them from twisting during their sliding movements.

The truck may be assembled in the following manner: The lower ends of the columns 7 are first inserted within the openings in the respective tension members 6 of the side frames. The followers 19 are thereafter inserted and the springs 23 are interposed between the abutment 25 and the respective followers 19. The bolster 8 and the spring plank 10 may then be inserted between the columns 7. The tension members are then applied over the heads 18 of the respective columns 7, the upper followers 19 and their cooperating springs 23 thereafter being inserted in position. The bolster is then moved upwardly and the bolster springs 13 are placed in position beneath it. The bolts 9 which connect the respective journal boxes to the side frame members 1, and which also serve to maintain the tension and compression members 5 and 6, respectively, in assembled relation, are finally inserted to complete the assembly of the structure.

When either side frame member 1 is displaced longitudinally of the truck from normal position as occurs, for example, when the truck passes around a curve, the bolster 8 and the spring plank 10 are caused to angle horizontally with respect to the side frame members. The angular movements of the bolster and spring plank cause a corresponding rotation of the struts or bolster guides 7. As the bolster guides rotate from their normal positions their cam heads 15 force the corresponding followers 19 to slide longitudinally towards their corresponding intermediate abutments 22 and 25, respectively. This movement of the followers is opposed by the springs 23, which are compressed to an extent corresponding to the rotation of the guide columns 7. Upon cessation of the external force causing the side frame members 1 to be displaced from normal position, the expansion of the springs 23 causes the followers 19 to rotate the guide columns back to their normal positions, such rotation of the columns serving to move the bolster 8 and spring plank 10 through the horizontal angle necessary to restore them to normal position. The return of the bolster and spring plank to normal results in a corresponding relative longitudinal movement of the side frame members 1 so that they also are restored to normal position.

I claim:—

1. In a car truck, the combination with side frame members which are relatively movable longitudinally of the truck and each of which comprises a tension member, a compression member and interposed struts or bolster guide columns which are rotatable with respect to said tension and compression members, of means for movably connecting said side frames, and means acting upon said column guides for resisting longitudinal displacement of either side frame member from normal position.

2. In a car truck, the combination with side frame members which are relatively movable longitudinally of the truck, each side frame member including rotatable bolster guide columns, of means for movably connecting said side frame members, and spring means disposed longitudinally of the truck and mounted upon said side frame members and acting upon said bolster guide columns for resisting longitudinal displacement of either side frame member from normal position.

3. In a car truck, the combination with side frame members which are relatively movable longitudinally of the truck, of a bolster adapted to move vertically and to angle horizontally with reference to said side frame members, and means cooperating with said bolster intermediate the ends of said side frame members for resisting longitudinal displacement of either side frame member from normal position.

4. In a car truck, the combination with side frame members which are relatively movable longitudinally of the truck and each of which is furnished with rotatable bolster guide columns, of means for movably connecting said side frame members, and yielding means acting upon one of said guide columns for resisting relative longitudinal displacement of said side frame members from normal position.

5. In a car truck, the combination with side frame members which are relatively movable longitudinally of the truck and which are furnished with rotatable bolster guide columns, of a bolster which has its opposite ends embraced by said bolster guide columns, and yielding means extending longitudinally of said side frame members and coacting with said columns for resisting relative longitudinal displacement of said side frame members from normal position.

6. In a car truck, the combination with side frame members which are relatively movable longitudinally of the truck, of a bolster for movably connecting said side frame members, and a plurality of yielding means mounted on said frame members above and below said bolster for resisting a relative longitudinal displacement of said side frame members from normal position.

7. In a car truck, the combination with side frame members which are relatively movable longitudinally of the truck, of a bolster for movably connecting said frame members, and longitudinally disposed yielding means mounted on said frame members independently of said bolster and adapted to cooperate therewith for resisting a relative longitudinal displacement of said side frame members from normal position.

8. In a car truck, the combination with side frame members which are relatively movable longitudinally of the truck, of a spring plank for movably connecting said side frame members, and means including rotatable bolster guide columns for yieldingly resisting relative longitudinal displacement of said side frame members from normal position.

9. In a car truck, the combination with side frame members which are relatively movable longitudinally of the truck, of a spring plank for movably connecting said side frame members, and means including rotatable bolster guide columns adapted to engage the spring plank for yieldingly resisting longitudinal displacements of said side frame members from normal position.

10. In a car truck, the combination with side frame members which are relatively movable longitudinally of the truck, of a spring plank movably connecting said side frame members, and spring means mounted on said side frames independent of said spring plank and adapted to be energized by an angular movement of said spring plank with respect to said frame members for resisting relative longitudinal displacement of the latter from normal position.

11. In a car truck, the combination with side frame members which are relatively movable longitudinally of the truck, of means for movably connecting said side frame members, and longitudinally disposed means for yieldingly resisting relative longitudinal displacement of said frame members from normal position, said last named means involving a spring and rotatable means for energizing said spring, said rotatable means being adapted to engage and be rotated by said connecting means.

12. In a car truck, the combination of side frame members which are relatively movable longitudinally of the truck, and a bolster which is adapted to move vertically and to angle horizontally with respect to said side frame members, said side frame members being provided with yielding guide columns cooperating with said bolster.

13. In a car truck, the combination with side frame members which are relatively movable longitudinally of the truck, of a bolster rotatable with respect to said frame members, a spring plank pivotally connected at its opposite ends to said frame members, and means adapted to engage the said bolster and spring plank and including rotatable bolster guide columns for yieldingly resisting a relative rotation between a side frame member and said spring plank away from normal position.

14. In a car truck, the combination with side frame members which are relatively movable longitudinally of the truck and each of which comprises a tension member, a compression member and interposed struts which are rotatably mounted between the said tension and compression members, of means for movably connecting said side frame members, said means being adapted to rotate said struts upon relative longitudinal movement of said side frame members from normal position, and lever actuated yielding means for resisting such rotation.

15. In a car truck, the combination with side frame members which are relatively movable longitudinally of the truck, of means for movably connecting said side frame members, and means for yieldingly resisting relative longitudinal displacement of said side frame members from normal position, said last named means involving a spring and a lever device adapted to be rotated by said connecting means to energize said spring.

In testimony whereof I affix my signature.

BYERS W. KADEL.